United States Patent
Kim et al.

(10) Patent No.: US 11,150,201 B2
(45) Date of Patent: Oct. 19, 2021

(54) SYSTEM AND METHOD OF DETECTING DEFECT OF OPTICAL FILM

(71) Applicant: SHANJIN OPTOELECTRONICS (SUZHOU) CO., LTD., Zhangjiagang (CN)

(72) Inventors: Ho Jin Kim, Daejeon (KR); Myoung Gon Yang, Daejeon (KR); Chang Seok Park, Daejeon (KR); Je Hyun Kim, Daejeon (KR); Hang Suk Choi, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 37 days.

(21) Appl. No.: 16/303,894

(22) PCT Filed: Mar. 23, 2017

(86) PCT No.: PCT/KR2017/003154
§ 371 (c)(1),
(2) Date: Nov. 21, 2018

(87) PCT Pub. No.: WO2017/204452
PCT Pub. Date: Nov. 30, 2017

(65) Prior Publication Data
US 2020/0209167 A1   Jul. 2, 2020

(30) Foreign Application Priority Data

May 24, 2016   (KR) ......................... 10-2016-0063703

(51) Int. Cl.
*G01N 21/958*   (2006.01)
*G01N 21/88*   (2006.01)
*G01N 21/86*   (2006.01)

(52) U.S. Cl.
CPC ..... *G01N 21/958* (2013.01); *G01N 2021/8636* (2013.01); *G01N 2021/8819* (2013.01)

(58) Field of Classification Search
CPC .... G01N 21/896; G01N 21/89; G01N 21/892; G01N 21/958; G01N 21/88; G01B 11/30
See application file for complete search history.

(56) References Cited

U.S. PATENT DOCUMENTS 3,322,024 A * 5/1967 Preston ................ G01N 21/896
356/430
5,220,178 A * 6/1993 Dreiling ............. G01N 21/8914
250/559.03

FOREIGN PATENT DOCUMENTS

JP   2001-201429 A   7/2001
JP   2005-148568 A   6/2005
(Continued)

*Primary Examiner* — Rebecca C Bryant
(74) *Attorney, Agent, or Firm* — Schmeiser, Olsen & Watts, LLP

(57) ABSTRACT

The present disclosure relates to a system and a method of detecting a defect of an optical film, and more particularly, to a system and a method of detecting a defect of an optical film, which obtain an image of a defect of an optical film projected onto a screen and detect the defect of the optical film.

As an exemplary embodiment of the present disclosure, a system for detecting a defect of an optical film may be provided. The system for detecting a defect of an optical film may include: a lighting unit, which is spaced apart from the optical film, and irradiates light toward one surface of the optical film; a screen, which is spaced apart from the other surface of the optical film, and on which a defect existing in the optical film is projected and displayed according to the pass of the light irradiated from the lighting unit through the optical film; an imaging unit, which is spaced apart from the screen, and obtains an image of the defect of the optical film (Continued)

projected onto the screen; and an analyzing unit, which analyzes the obtained image, and detects the defect of the optical film based on a result of the analysis.

7 Claims, 8 Drawing Sheets

(56) References Cited

FOREIGN PATENT DOCUMENTS

| | | | | |
|---|---|---|---|---|
| JP | 2005-241586 A | | 9/2005 | |
| JP | 2005241586 | * | 9/2005 | |
| JP | 2007212442 | * | 8/2007 | |
| JP | 2007-332253 A | | 12/2007 | |
| JP | 2010-256021 A | | 11/2010 | |
| JP | 2011-085520 A | | 4/2011 | |
| JP | 2011-145082 A | | 7/2011 | |
| JP | 2012-215566 | * | 9/2012 | ............ G01N 21/88 |
| JP | 2012-215566 A | | 11/2012 | |
| KR | 10-0769326 B1 | | 10/2007 | |
| KR | 10-1082699 B1 | | 11/2011 | |
| KR | 101082699 B1 | | 11/2011 | |
| KR | 10-1464877 B1 | | 11/2014 | |

* cited by examiner

Fig. 2

| DISTANCE (mm) | AVERAGE PEAK BRIGHTNESS VALUE | DECREASE RATIO | PROJECTED IMAGE |
|---|---|---|---|
| 60~90 | 62 | 11% | |
| 90~130 | 70 | - | |
| 130~160 | 52 | 26% | |

| DISTANCE (mm) | AVERAGE PEAK BRIGHTNESS VALUE | DECREASE RATIO | PROJECTED IMAGE |
|---|---|---|---|
| 250~280 | 70.5 | 23% |  |
| 280~340 | 92 | - |  |
| 340~370 | 75 | 18% |  |

Fig. 4b

| DISPOSITION STRUCTURE OF IMAGING UNIT | AVERAGE PEAK BRIGHTNESS VALUE | DECREASE RATIO | PROJECTED IMAGE |
|---|---|---|---|
| OPTICAL FILM IS NOT PRESENT BETWEEN SCREEN AND IMAGING UNIT (ONE EXEMPLARY EMBODIMENT OF PRESENT INVENTION) | 70 | - | |
| OPTICAL FILM IS PRESENT BETWEEN SCREEN AND IMAGING UNIT | 53 | 24% | |

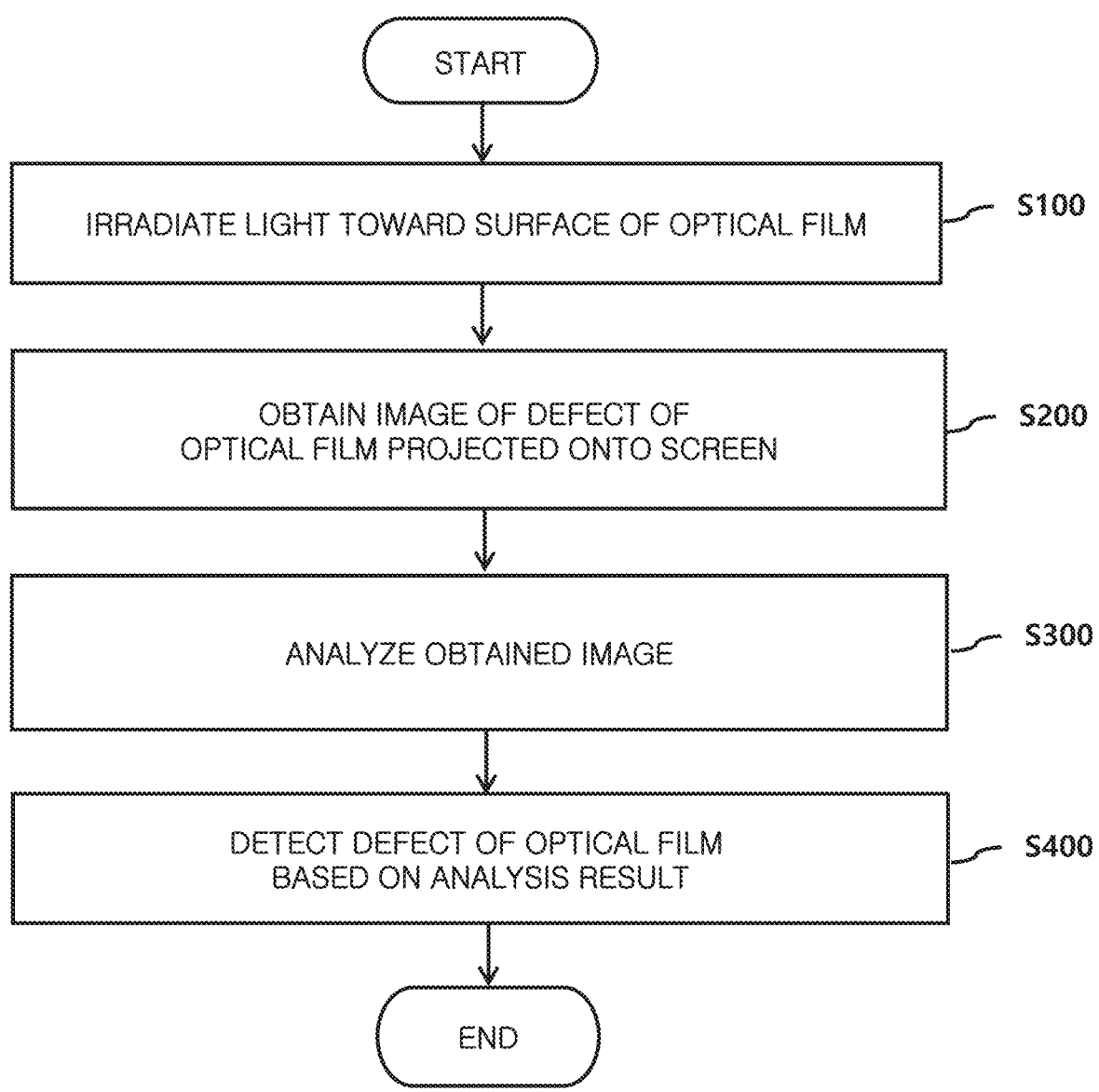

SYSTEM AND METHOD OF DETECTING DEFECT OF OPTICAL FILM

This application is a National Stage Entry of International Application No. PCT/KR2017/003154, filed on Mar. 23, 2017, and claims the benefit of and priority to Korean Application No. 10-2016-0063703, filed on May 24, 2016, all of which are hereby incorporated by reference in their entirety for all purposes as if fully set forth herein.

TECHNICAL FIELD

One or more exemplary embodiments of the present disclosure relate to a system and a method of detecting a defect of an optical film, and more particularly, to a system and a method of detecting a defect of an optical film, which obtain an image of a defect of an optical film projected onto a screen and detect the defect of the optical film.

BACKGROUND ART

An optical film provides transmitted light required for forming an image, and is a main optical component, which is mainly used in a liquid crystal display (LCD) panel and the like and exerts a large influence on a quality of the display panel.

The optical film may be formed by attaching a protective film onto both surfaces of a polarizing device and applying an adhesive, such as PSA, onto at least one external surface of the polarizing device. However, during the process of manufacturing the optical film, a phenomenon, in which the film is pressed when foreign substances are introduced to the film or the film is wound around a roller, a phenomenon, in which the film is pressed by a change in a thickness of a bonding agent or an adhesive applied onto the film, and a phenomenon, in which the film is pressed or the film is imprinted by other external force, may be generated.

A defect of the optical film generated by the phenomena may cause a bright spot defect in the display panel, in which the optical film is used, so that an examination of a defect of the film after the optical film is manufactured is an essential process.

Korean Patent No. 10-1082699 (hereinafter, Patent Document 1) suggests an apparatus for examining a defect of an optical film by photographing an image of the optical film. The Patent discloses the contents that an optical film is examined by allowing light irradiated from a light source to pass through the optical film and photographing the optical film in a form of an image by a photographing means installed at a position facing the light source. However, the Patent has a limitation in that only a defect by foreign substances among the defects existing in the optical film is detected.

RELATED ART LITERATURE

Patent Document

Patent Document 1: Korean Patent No. 10-1082699
Patent Document 2: Japanese Patent Application Laid-Open No. 2007-332253

DETAILED DESCRIPTION OF THE INVENTION

Technical Problem

A technical object to be solved by one or more exemplary embodiments of the present disclosure is to provide a system and a method of detecting a defect of an optical film, which allow light irradiated to an optical film to be projected onto a screen, thereby detecting various forms of defects, such as press, imprint, and folding, of the optical film generated during a process of manufacturing the optical film, and improving a rate of the detection of the defect of the optical film.

Technical Solution

An exemplary embodiment of the present disclosure provides a system for detecting a defect of an optical film. The system for detecting a defect of an optical film may include: a lighting unit, which is spaced apart from the optical film, and irradiates light toward one surface (e.g., a front surface or a rear surface) of the optical film; a screen, which is spaced apart from the other surface (e.g, a rear surface or a front surface) of the optical film, and on which a defect existing in the optical film is projected and displayed according to the pass of the light irradiated from the lighting unit through the optical film; an imaging unit, which is spaced apart from the screen, and obtains an image of the defect of the optical film projected onto the screen; and an analyzing unit, which analyzes the obtained image, and detects the defect of the optical film based on a result of the analysis.

A distance d1 between the screen and the optical film may have a value within a range of 90 mm to 130 mm, and a distance d2 between the lighting unit and the optical film may have a value within a range of 280 mm to 340 mm.

The imaging unit and the screen may be disposed so as to have a first angle $\theta_1$, the lighting unit and the optical film may be disposed so as to have a second angle $\theta_2$, and the first angle and the second angle may have the same value.

The optical film, to which the light is to be irradiated, and the screen may be disposed to be parallel to each other.

The first angle $\theta_1$ and the second angle $\theta_2$ may have a value within a range of 25° to 48°.

The system may further include transferring rollers for transferring the optical film, in which the transferring roller may transfer the optical film in a form of an in-line, in which a travelling direction is one direction.

The system may further include a dark room, which prevents the light irradiated from the lighting unit from leaking to the outside of the system for detecting the defect of the optical film.

The imaging unit may be spaced apart from the other surface of the optical film to directly obtain an image projected and focused on the screen without passing through the optical film.

The lighting unit may irradiate light in an entire width direction of the optical film.

Another exemplary embodiment of the present disclosure provides a method of detecting a defect of an optical film by using a projected image, the method including: irradiating light to one surface of the optical film through a lighting unit, which is spaced apart from the optical film; obtaining an image of a defect of the optical film projected onto a screen according to a pass of the light irradiated from the lighting unit through the optical film through an imaging unit; analyzing the obtained image; and detecting the defect on the optical film based on the analysis result.

According to one or more exemplary embodiments, a non-transitory computer-readable recording medium having recorded thereon a program for executing the method is provided.

Advantageous Effects

According to the system and method of detecting a defect of an optical film according to the exemplary embodiment of the present disclosure, it is possible to detect various forms of defects, such as a pressed defect, a stamped defect, and a folded defect, of the optical film. Further, light irradiated to the optical film is projected onto the screen by setting a distance between the screen and the optical film, a distance between the lighting unit and the optical film, an angle between the imaging unit and the screen, and an angle between the lighting unit and the optical film within predetermined ranges, thereby improving a rate of detection of a defect of the optical film.

BRIEF DESCRIPTION OF DRAWINGS

FIG. 2 is a table representing a comparison of average brightness of images projected onto a screen when a distance d1 between the screen and an optical film is within a range according to an exemplary embodiment of the present disclosure and within another range.

FIG. 4B is a table representing a comparison of average brightness of images projected onto a screen between the system for detecting a defect of an optical film according to FIG. 4A and the system for detecting a defect of an optical film according to the present disclosure.

FIG. 7 is as flowchart illustrating a method of detecting a defect of an optical film by using a projected image.

DETAILED DESCRIPTION

Figure 1:
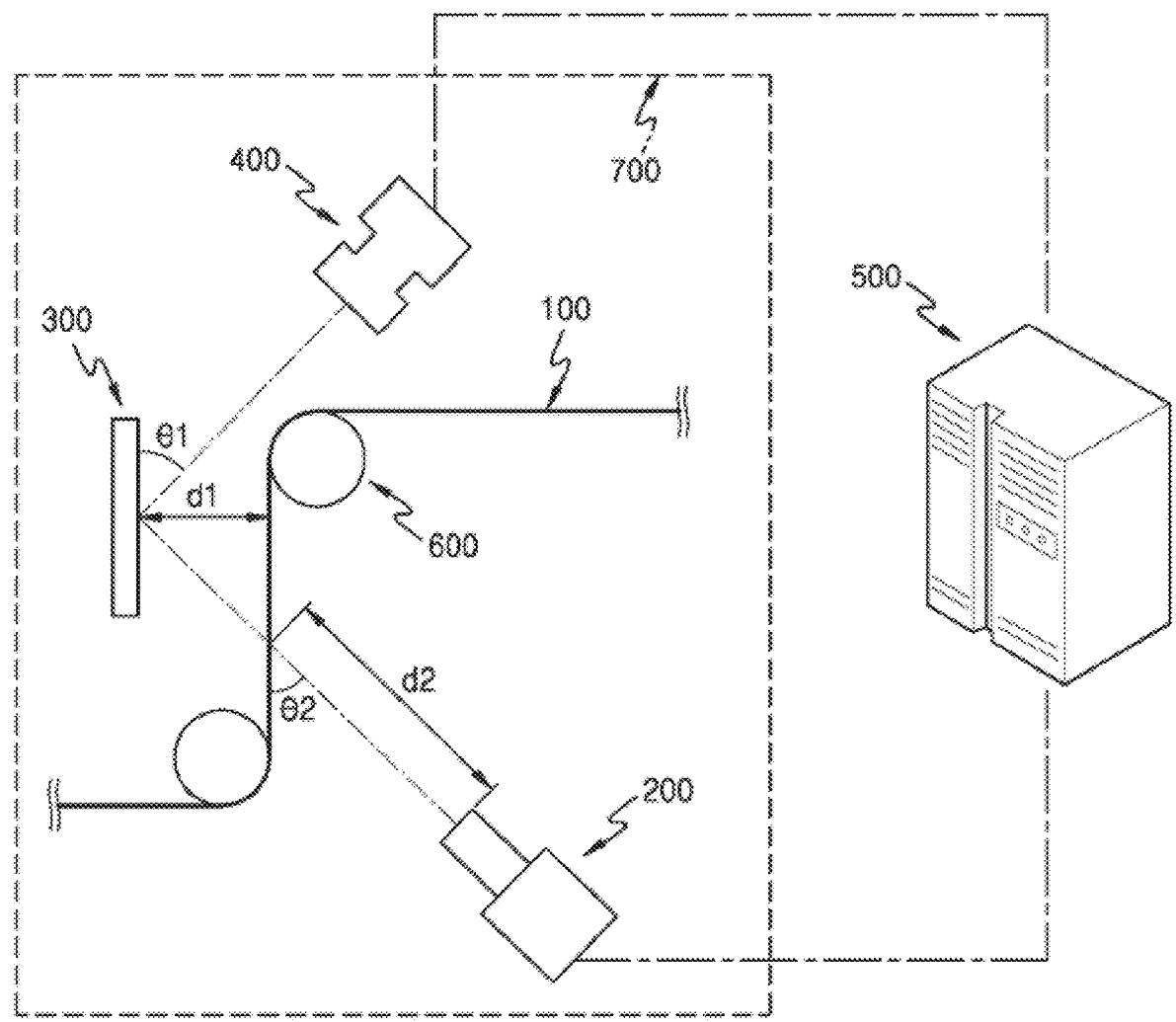
FIG. 1 is a diagram illustrating a configuration and a layout of a system for detecting a defect of an optical film according to an exemplary embodiment of the present disclosure.

Hereinafter, the exemplary embodiment of the present disclosure will be described in detail with reference to the accompanying drawings so that those skilled in the art can easily carry out the present disclosure. However, the present disclosure may be implemented in various different forms, and is not limited to the exemplary embodiments described herein. A part irrelevant to the description will be omitted in the drawings to clearly describe the present disclosure, and the similar elements will be designated by the similar reference numerals throughout the specification.

Terms used in the present specification will be briefly described, and the present disclosure will be described in detail.

As terms used in the present disclosure, general terms currently and widely used are selected while considering the functions in the present disclosure, but the terms may be changed according to an intention of those skilled in the art or precedent, appearance of new technology, and the like. Further, in a specific case, there is a term randomly selected by an applicant, and in this case, a meaning of the term will be described in detail in the corresponding description of the invention. Accordingly, the terms used in the present disclosure shall be defined based on the meaning of the term and the contents throughout the present disclosure, not the simple name of the term.

Throughout the specification, unless explicitly described to the contrary, the word "comprise" and variations such as "comprises" or "comprising" will be understood to imply the inclusion of stated elements but not the exclusion of any other elements. In addition, the term " . . . unit" described in the specification means a unit for processing at least one function and operation and may be implemented by hardware components or software components and combinations thereof.

Hereinafter, embodiments of the present disclosure will be described in detail with reference to the accompanying drawing.

FIG. 1 illustrates a system for detecting a defect of an optical film according to an exemplary embodiment of the present disclosure. Referring to FIG. 1, the system for detecting a defect of an optical film according to the exemplary embodiment of the present disclosure may include a lighting unit 200, a screen 300, an imaging unit 400, and an analyzing unit 500.

The lighting unit 200 of the present disclosure is spaced apart from an optical film 100, and may irradiate light toward one surface of the optical film 100. Here, the optical film 100 is the same configuration as the optical film described in the background art, and may be provided in a form of a sheet.

In the meantime, the lighting unit 200 may irradiate light in a direction of an entire width of the optical film 100, and may use an LED in consideration of life, brightness stability, and maintenance and repair of the lighting unit 200. Further, the lighting unit 200 may be formed of a plurality of LEDs, and may use a light, such as a fluorescent light and an incandescent light, in addition to an LED. However, the lighting unit 200 is not limited to the enumerated kinds of lighting.

The light irradiated from the lighting unit 200 passes through the optical film 100 and a defect existing in the optical film 100 is projected, so that the screen 300 may display the projected defect in a form of a light and shade image. That is, the screen 300 may allow the light and shade image formed by the projection of the defect existing in the optical film 100 to be focused. Accordingly, the screen 300 may be spaced apart from a surface, from which the light irradiated from the lighting unit 200 passes through the optical film 100 and is emitted, as illustrated in FIG. 1.

The screen 300 according to the exemplary embodiment of the present disclosure is a general screen utilized for projecting light, and is a sort of PVC, and may be formed of a polypropylene sheet, but the screen 300 is not essentially limited thereto. In the meantime, the screen 300 according to the exemplary embodiment of the present disclosure may have a light diffuse transmission property.

In the meantime, a defect existing in the optical film 100 may be represented in various forms of the optical film, such as being pressed, imprinted, folded, or wrinkled, by external force. More particularly, the defect existing in the optical film 100 means a defect, in which a form of a front surface or a rear surface of the optical film is distorted or a shape of the optical film is changed, by a press of the optical film by an introduction of foreign substances, a press generated when the optical film is wound around a transferring roller 600, a press generated according to a change in a thickness of a bonding material or an adhesive applied onto the optical film, a wrinkle generated according to a folding of the optical film, or the like.

When the optical film 100 is pressed and has a convex form (for example, a form of magnifying glasses), an image projected and focused on the screen 300 may have increased brightness compared to a normal projected image and be displayed on the screen 300 in a form of a white spot.

In the meantime, when foreign substances are introduced to the optical film 100, the light irradiated from the lighting unit 200 fails to pass through the optical film 100, so that the image projected and focused on the screen 300 becomes darker than a normal projected image and be displayed on the screen 300 in a form of a black spot.

Further, when the optical film 100 is folded or stamped, the image projected onto the screen 300 may be displayed in a line form, in which white spots or black spots are elongated.

The imaging unit 400 according to the exemplary embodiment of the present disclosure may be spaced apart from the screen 300 and may obtain an image of a defect of the optical film. A method of obtaining the image may be performed by photographing a light and shade image projected and focused on the screen 300 by the defect of the optical film 100 by using a camera configuring the imaging unit 400 and converting the photographed image into image data. The camera may be a charge-coupled device (CCD) sensor or a scan camera, but is not limited thereto.

The analyzing unit 500 according to the exemplary embodiment of the present disclosure may image-process the received image data into a numerical value for brightness of an image by using the image data obtained from the imaging unit 400 as input data. An analysis of determining whether the data, which passes through the image processing, is a black sport or a white sport by comparing brightness values between the data and a normal projected image and detecting a defect may be performed on the data, which passes through the image processing. Further, an analysis of measuring a size of a portion represented as the black spot or the white spot and detecting a defect may also be performed.

The analyzing unit 500 may include an electronic device, in which an analysis program capable of performing image processing and comparative analysis is embedded. For example, the analyzing unit may be a computer, a tablet PC, a personal portable phone, a wearable device, and a programmable logic controller (PLC).

In the system for detecting a defect of an optical film according to the exemplary embodiment of the present disclosure, a distance d1 between the screen 300 and the optical film 100, a distance d2 between the lighting unit 200 and the optical film 100, an angle $\theta_1$ between the imaging unit 400 and the screen 300, or an angle $\theta_2$ between the lighting unit 200 and the optical film 100 may be defined within a specific range. A particular range of the distance or the angle is described in below.

The distance d1 between the screen 300 and the optical film 100 according to the exemplary embodiment of the present disclosure may have a value within a range of 90 mm to 130 mm, and the distance d2 between the lighting unit 200 and the optical film 100 may have a value within a range of 280 mm to 340 mm.

FIG. 2 is a table representing a comparison of average brightness of images projected onto the screen when the distance d1 between the screen and the optical film is within the range according to the exemplary embodiment of the present disclosure and within another range.

As illustrated in FIG. 2, when the distance d1 between the screen 300 and the optical film 100 is in the range of 90 mm to 130 mm, average brightness (measured for the defect displayed as the white spot in the exemplary embodiment of the present disclosure) of the projected image has a value of 70, but when the distance d1 between the screen 300 and the optical film 100 is equal to or less than 90 mm (in the exemplary embodiment of the present disclosure, the case where the distance d1 between the screen 300 and the optical film 100 is in the range of 60 mm to 90 mm), average brightness of the projected image has a value of 62, which is decreased by 11% from 70, and when the distance d1 between the screen 300 and the optical film 100 is equal to or larger than 130 mm (in the exemplary embodiment of the present disclosure, the case where the distance d1 between the screen 300 and the optical film 100 is in the range of 130 mm to 160 mm), average brightness of the projected image has a value of 52, which is decreased by 26% from 70.

A gray level expressed from 0 to 255 is used for a numerical value of brightness of the projected image according to the exemplary embodiment of the present disclosure, and the distance d2 between the lighting unit 200 and the optical film 100 is fixed with 110 mm when the distance d1 between the screen 300 and the optical film 100 is adjusted. As can be seen in FIG. 2, when the distance between the screen 300 and the optical film 100 is smaller than 90 mm to 130 mm, a size of the defect represented as the white spot is small, but when the distance between the screen 300 and the optical film 100 is larger than 90 mm to 130 mm, a size of the defect represented as the white spot is large.

That is, according to the exemplary embodiment of the present disclosure, the brightness and the size of the portion corresponding to the defect in the image projected onto the screen 300 may have a correlation with the distance between the screen 300 and the optical film 100.

Figure 3:
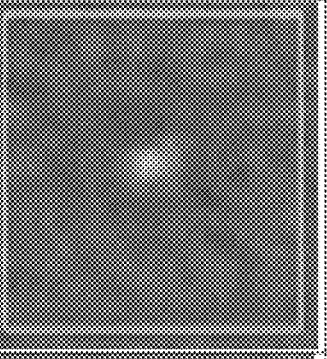
FIG. 3 is a table representing a comparison of average brightness of images projected onto a screen when a distance d2 between a lighting unit and an optical film is within a range according to an exemplary embodiment of the present disclosure and within another range.
Figure 3:
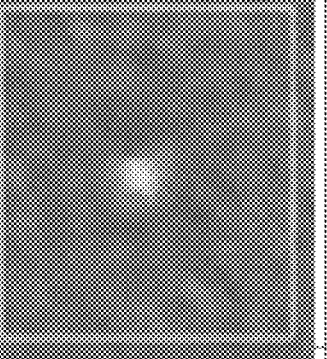
Figure 3:
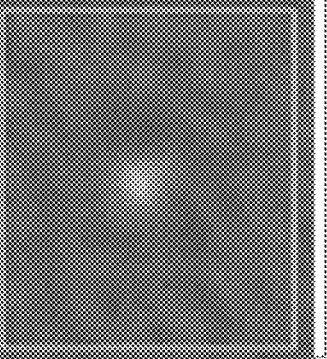

FIG. 3 is a table representing a comparison of average brightness of images projected onto the screen when the distance d2 between the lighting unit 200 and the optical film 100 is within a range according to the exemplary embodiment of the present disclosure and within another range. As illustrated in FIG. 3, when the distance d2 between the lighting unit 200 and the optical film 100 is adjusted, the distance d1 between the screen 300 and the optical film 100 is fixed at 110 mm.

As illustrated in FIG. 3, when the distance d2 between the lighting unit 200 and the optical film 100 is in the range of 280 mm to 340 mm, average brightness (measured for the defect displayed as the white spot in the exemplary embodiment of the present disclosure) of the projected has a value of 92, but when the distance d2 between the lighting unit 200 and the optical film 100 is equal to or less than 280 mm (in the exemplary embodiment of the present disclosure, the case where the distance d2 between the lighting unit 200 and the optical film 100 is in the range of 250 mm to 280 mm), average brightness of the projected image has a value of 70.5, which is decreased by 23% from 92, and when the distance d2 between the lighting unit 200 and the optical film 100 is equal to or larger than 340 mm (in the exemplary embodiment of the present disclosure, the case where the distance d2 between the lighting unit 200 and the optical film 100 is in the range of 340 mm to 370 mm), average brightness of the projected image has a value of 75, which is decreased by 18% from 92.

That is, according to the exemplary embodiment of the present disclosure, the brightness of the portion corresponding to the defect in the image projected onto the screen 300 may have a correlation with the distance between the lighting unit 200 and the optical film 100.

The imaging unit 400 according to the exemplary embodiment of the present disclosure is spaced apart from the other surface of the surface, to which light is irradiated to the optical film 100 as illustrated in FIG. 1, so that the imaging unit 400 is installed so as to directly obtain an image projected and focused on the screen without passing through the optical film.

Figure 4A:
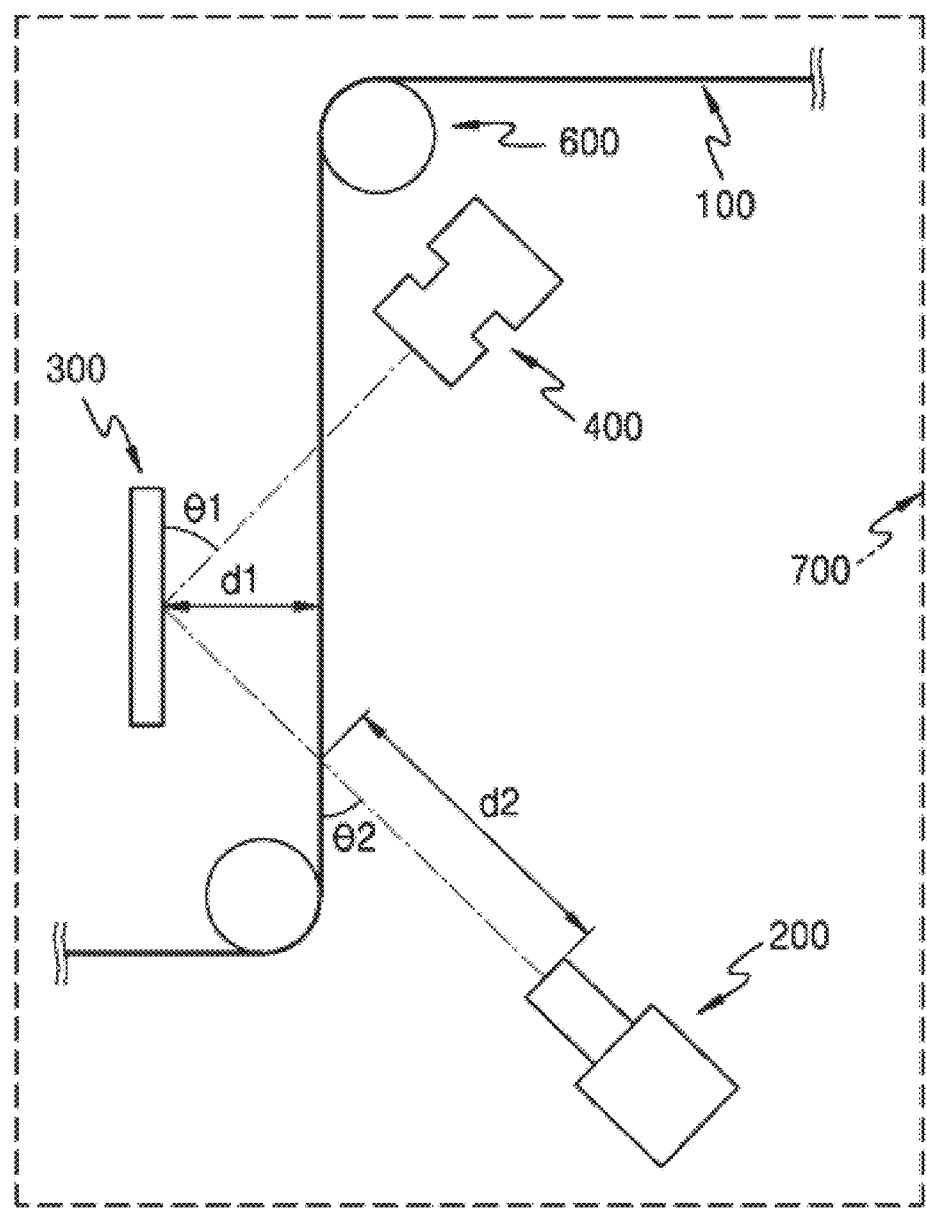
FIG. 4A is a diagram illustrating an example of a configuration and a layout of a system for detecting a defect of an optical film.

When a disposition structure of the imaging unit 400 according to the exemplary embodiment of the present disclosure is compared with a disposition structure of a imaging unit illustrated in FIG. 4A, it is possible to confirm excellence of the disposition structure of the imaging unit 400 according to the present disclosure.

FIG. 4A is a diagram illustrating an example of a configuration and a layout of a system for detecting a defect of an optical film. A imaging unit 400 illustrated in FIG. 4A is disposed so as to obtain an image of a defect projected onto a screen 300 through an optical film 100.

FIG. 4B is a table representing a comparison of average brightness of images projected onto the screen 300 between the system for detecting a defect of an optical film according to FIG. 4A and the system for detecting a defect of an optical film according to the present disclosure.

According to the disposition structure of the imaging unit 400, in which the optical film 100 is not present between the screen 300 and the imaging unit 400, according to the present disclosure, average brightness of the projected image has a value of 70, but according to the disposition structure, in which the optical film 100 is present between the screen 300 and the imaging unit 400, as illustrated in FIG. 4A, average brightness of the projected image has a value of 53, which is lower than 70 according to the exemplary embodiment of the present disclosure by 24%.

Accordingly, like the exemplary embodiment of the present disclosure, the projected image for the defect of the optical film of the system for detecting a defect of an optical film having the disposition structure, in which the optical film 100 is not present between the screen 300 and the imaging unit 400, is brighter than the projected image of the example case, so that the system for detecting a defect of an optical film of the exemplary embodiment of the present disclosure may increase a rate of detection of a defect.

In the meantime, the imaging unit 400 according to the exemplary embodiment of the present disclosure is disposed so as to have a first angle $\theta_1$ with the screen, and the lighting unit 200 is disposed so as to have a second angle θ2 with the optical film, and the first angle $\theta_1$ and the second angle $\theta_2$ may be the same as each other.

That is, the first angle $\theta_1$ between the imaging unit 400 and the screen 300 and the second angle $\theta_2$ between the lighting unit 200 and the optical film 100 are the same as each other, so that the first angle $\theta_1$ and the second angle $\theta_2$ may be increased or decreased together.

Accordingly, the optical film 100 positioned on the surface, to which light is irradiated, and the screen 300 may be disposed to be parallel to each other so that the first angle $\theta_1$ between the imaging unit 400 and the screen 300 and the second angle $\theta_2$ between the lighting unit 200 and the optical film 100 are the same as each other. That is, as illustrated in FIG. 1, the optical film 100, to which light is to be irradiated, may be positioned between two transferring rollers 600 and may be disposed so as to parallel to the screen 300.

The first angle $\theta_1$ between the imaging unit 400 and the screen 300 and the second angle $\theta_2$ between the lighting unit 200 and the optical film 100 according to the exemplary embodiment of the present disclosure may have values in a range of 25° to 48°.

Figure 5:
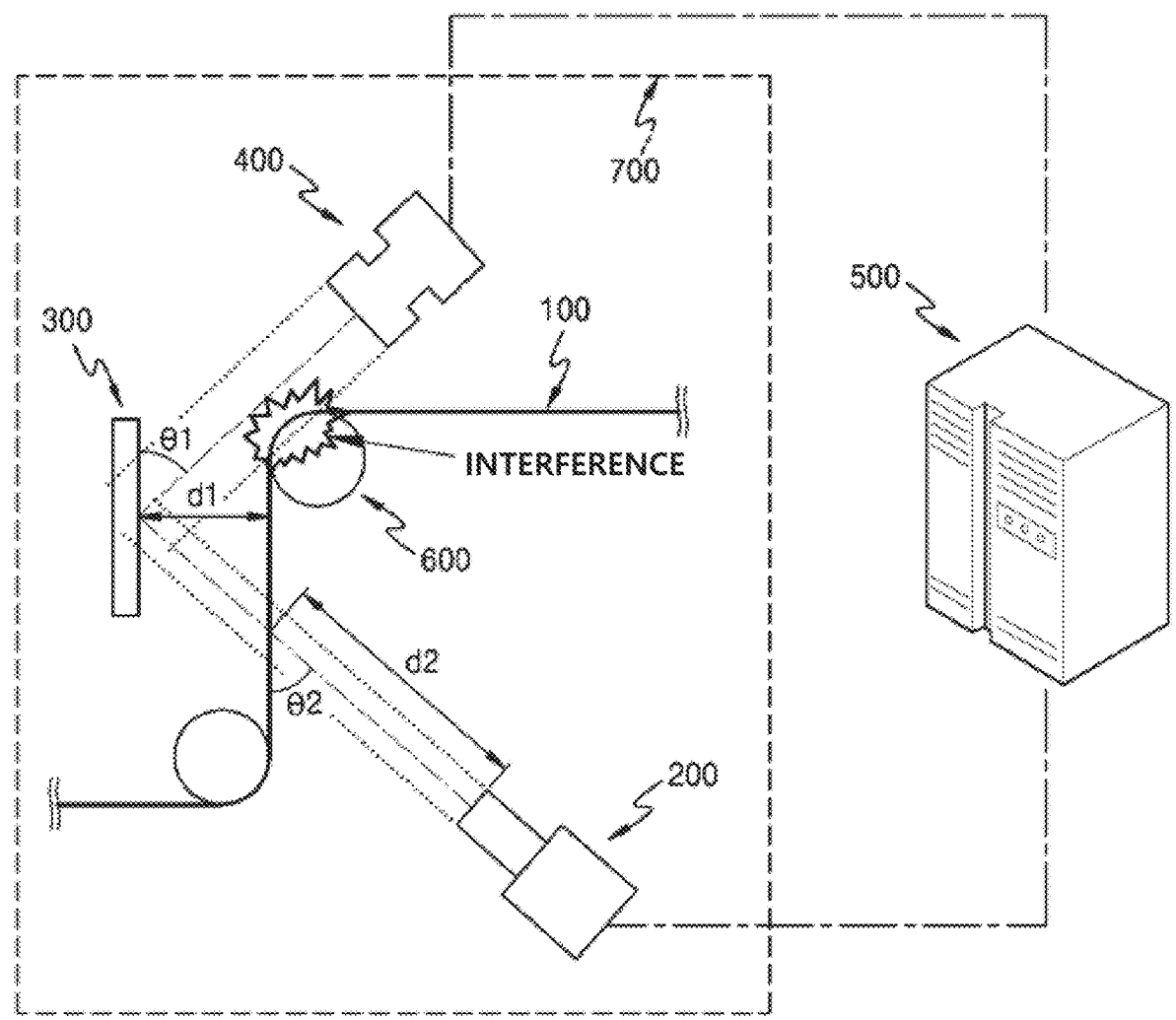
FIG. 5 is a diagram illustrating a phenomenon generated when an angle $\theta_1$ between an imaging unit and a screen is larger than a range according to an exemplary embodiment of the present disclosure.

FIG. 5 is a diagram illustrating a phenomenon, in which the angle $\theta_1$ between the imaging unit and the screen is larger than a range (equal to or larger than 48°) according to the exemplary embodiment of the present disclosure. That is, when the angle $\theta_1$ between the imaging unit 400 and the screen 300 is equal to or larger than 48°, interference is generated between the transferring roller 600 closely positioned to the imaging unit 400 and an image section photographed by the imaging unit 400, so that an obstacle may be created in obtaining an image focused on the screen.

Figure 6:
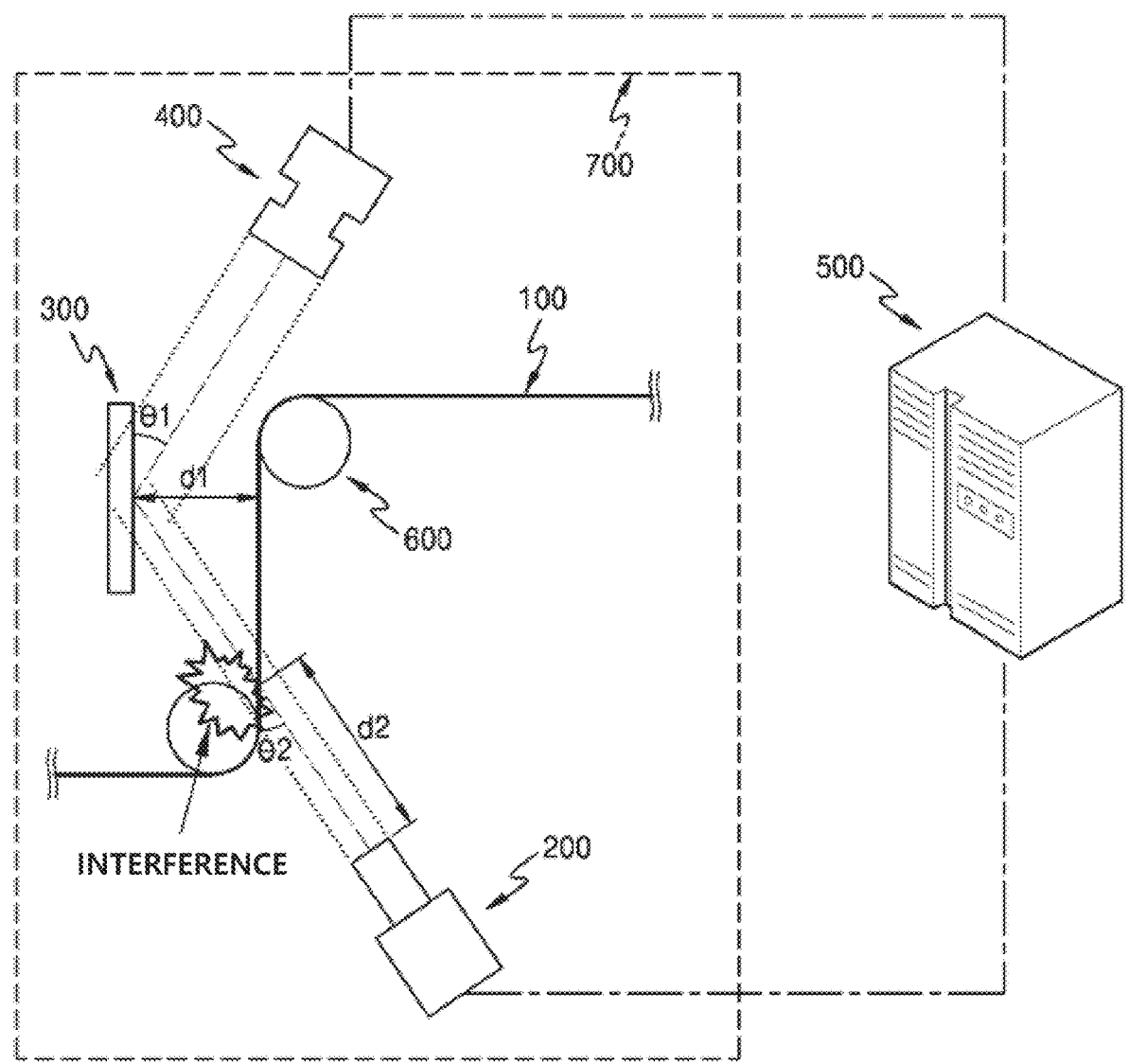
FIG. 6 is a diagram illustrating a phenomenon generated when an angle $\theta_2$ between a lighting unit and an optical film is smaller than a range according to an exemplary embodiment of the present disclosure.

FIG. 6 is a diagram illustrating a phenomenon generated when the angle $\theta_2$ between the lighting unit and the optical film is smaller than a range (equal to or less than 25°) according to the exemplary embodiment of the present disclosure. That is, when the angle $\theta_2$ between the lighting unit 200 and the optical film 100 is equal to or less than 25°, interference is generated between the transferring roller 600 closely positioned to the lighting unit 200 and a section through which the light irradiated from the lighting unit 200 passes, so that an obstacle may be created in obtaining an image focused on the screen.

Further, when the first angle $\theta_1$ between the imaging unit 400 and the screen 300 and the second angle $\theta_2$ between the lighting unit 200 and the optical film 100 have values other than the range according to the exemplary embodiment of the present disclosure, boundary reflection or diffused reflection is generated, so that homogeneity of light quantity is decreased. Accordingly, the imaging unit 400 may obtain a distorted image for the defect of the optical film.

In the meantime, the distance between the imaging unit 400 and the screen 300 is related to resolution of the camera of the imaging unit 400, so that the distance may be changed according to the resolution.

The system for detecting a defect of an optical film according to the exemplary embodiment of the present disclosure may further include the transferring rollers 600 for transferring the optical film 100, and the transferring roller 600 may transfer the optical film 100 in a form of an in-line in which a travelling direction is one direction. Accordingly, the optical film 100 may be continuously transferred along the transferring roller 600 according to an operation, in which the transferring roller 600 is rolled, and the light irradiated from the lighting unit 200 may reach to the surface of the optical film 100, which is transferred between the transferring rollers 600.

The system for detecting a defect of an optical film according to the exemplary embodiment of the present disclosure may further include a dark room 700, which prevents the light irradiated from the lighting unit 200 from leaking to the outside of the system for detecting a defect of an optical film.

FIG. 7 is a flowchart illustrating a method of detecting a defect of an optical film by using a projected image.

A method of detecting a defect of an optical film by using a projected image according to the exemplary embodiment of the present disclosure may include: an operation S100 of irradiating light to one surface (e.g, a front surface or a rear surface) of the optical film 100 through the lighting unit 200, which is spaced apart from the optical film 100; an operation S200 of obtaining an image of a defect of the optical film 100 projected onto the screen 300 according to the pass of the light irradiated from the lighting unit 200 through the optical film 100 through the imaging unit 400; an operation S300 of analyzing the obtained image; and an operation S400 of detecting the defect on the optical film 100 based on the analysis result.

In relation to the method according to the exemplary embodiment of the present disclosure, the aforementioned contents of the system may be applied. Accordingly, in relation to the method, the description of the same contents as those of the system is omitted.

In the meantime, as the exemplary embodiment of the present disclosure, a computer program, which is combined with hardware, such as a computer, and is stored in a medium for executing the aforementioned method, may be provided.

The exemplary embodiment of the present disclosure may also be implemented in a form of a recording medium including a computer executable command, such as a program module executed by a computer. A computer readable medium may be a predetermined computer-accessible available medium, and include all of the non-volatile media and the separable and inseparable media. Further, the computer readable medium may include all of a computer storage medium. The computer storage medium includes all of the non-volatile media and the separable and inseparable media implemented by a predetermined method or technology for storing a computer readable command, a data structure, a program module, or information, such as other data. The communication media typically includes a compute readable command, a data structure, a program module.

The description of the present disclosure is for illustrative, and it may be understood that those skilled in the art may easily modify the present disclosure into other particular forms without changing the technical spirit or the essential characteristics of the present disclosure. Thus, it shall be appreciated that the exemplary embodiments described above are intended to be illustrative in every sense, and not restrictive. For example, each constituent element described in a singular form may be distributed and carried out, and similarly, constituent elements described in a distributed form may be carried out in a combination form.

The scope of the present disclosure is represented by the claims to be described below rather than the detailed description, and it shall be interpreted that the meaning and scope of the claims and all the changes or modified forms derived from the equivalents thereof belong to the scope of the present disclosure.

The invention claimed is:

1. A system for detecting a defect of an optical film, the system comprising:
    a lighting unit, which is spaced apart from the optical film, and irradiates light toward one surface of the optical film;
    a screen, which is spaced apart from the other surface of the optical film, and on which the defect existing in the optical film is projected and displayed due to the passage of the light irradiated from the lighting unit through the optical film;
    an imaging unit, which is spaced apart from the screen, and obtains the image of the defect of the optical film projected onto the screen;
    an analyzing unit, which analyzes the obtained image, and detects the defect of the optical film based on a result of the analysis;
    wherein a distance (d1) between the screen and the optical film has a value of 90 mm to 130 mm and a distance (d2) between the lighting unit and the optical film has a value of 280 mm to 340 mm; and
    wherein the imaging unit and the screen are disposed at a first angle ($\theta_1$), relative to one another, the lighting unit and the optical film are disposed at a second angle ($\theta_2$) relative to one another, and the first angle and the second angle have the same value, and wherein the first angle ($\theta_1$) and the second angle ($\theta_2$) have a value within a range of 25° to 48°, and
    wherein the optical film, and the screen are disposed parallel to each other.

2. The system of claim 1, further comprising:
    transferring rollers for transferring the optical film,
    wherein the transferring roller transfers the optical film in a form of an in-line, travelling in one direction.

3. The system of claim 1, further comprising:
    a dark room, which prevents the light irradiated from the lighting unit from leaking outside of the system.

4. The system of claim 1, wherein the imaging unit is disposed so as to directly obtain the image projected on the screen without passing through the optical film.

5. The system of claim 1, wherein the lighting unit irradiates light along the entire width of the optical film.

6. A method of detecting a defect of an optical film by using a projected image, the method comprising:
    irradiating light onto one surface of the optical film through a lighting unit, which is spaced apart from the optical film;
    obtaining an image of the defect of the optical film projected onto a screen due to the passage of the light irradiated from the lighting unit through the optical film with an imaging unit;
    analyzing the obtained image; and
    detecting the defect on the optical film based on the analysis result,
    wherein the screen is spaced apart from the optical film, and the imaging unit is disposed so as to directly obtain the image projected on the screen without passing through the optical film;
    wherein a distance (d1) between the screen and the optical film has a value of 90 mm to 130 mm and a distance (d2) between the lighting unit and the optical film has a value of 280 mm to 340 mm; and
    wherein the imaging unit and the screen are disposed at a first angle ($\theta_1$), relative to one another, the lighting unit and the optical film are disposed at a second angle ($\theta_2$) relative to one another, and the first angle and the second angle have the same value, and wherein the first angle ($\theta_1$) and the second angle ($\theta_2$) have a value within a range of 25° to 48°, and
    wherein the optical film, and the screen are disposed parallel to each other.

7. A non-transitory computer-readable recording medium having recorded thereon a program for performing the method of claim 6.

* * * * *